United States Patent
Watanabe et al.

(10) Patent No.: US 6,284,988 B1
(45) Date of Patent: Sep. 4, 2001

(54) KEYBOARD APPARATUS THE OPERATION SIDE OF WHICH CAN BE ILLUMINATED

(75) Inventors: Kazutoshi Watanabe; Kazuhiro Yokoyama; Katsuyuki Suzuki; Satoru Takemori, all of Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/487,817

(22) Filed: Jan. 18, 2000

(30) Foreign Application Priority Data

Jan. 19, 1999 (JP) .................................................. 11-011011

(51) Int. Cl.⁷ ................................ H01H 9/00; G06G 3/02
(52) U.S. Cl. ......................... 200/5 A; 200/314; 200/317
(58) Field of Search ................................. 200/310–317, 200/341–345; 362/30

(56) References Cited

U.S. PATENT DOCUMENTS

| | | | |
|---|---|---|---|
| 4,812,831 | * | 3/1989 | Laier ................................. 200/312 X |
| 4,876,415 | * | 10/1989 | Clancy ................................. 200/5 A |
| 5,408,060 | * | 4/1995 | Muurinen ............................. 200/314 |
| 5,871,088 | * | 2/1999 | Tanabe ............................. 200/314 X |
| 5,901,834 | * | 5/1999 | Inubushi et al. . | |
| 6,007,209 | * | 12/1999 | Pelka ..................................... 362/30 |

FOREIGN PATENT DOCUMENTS

Hei 10-283096  10/1998 (JP).

* cited by examiner

Primary Examiner—J. R. Scott
(74) Attorney, Agent, or Firm—Brinks Hofer Gilson & Lione (57) ABSTRACT

The keyboard apparatus includes a plurality of key switches manipulated by keytops and a backlight means comprising an EL sheet for illuminating the operation side S constituted of the keytops from under it wherein the key switches are provided with permeable keytops and impermeable character portions and the backlight means has light emission positions allocated corresponding to key placements.

18 Claims, 7 Drawing Sheets

KEYBOARD APPARATUS THE OPERATION SIDE OF WHICH CAN BE ILLUMINATED

BACKGROUND OF THE INVENTION

1. Field of the Invention

The present invention relates to a keyboard apparatus and more particularly to technology suitably used for a keyboard apparatus the operation side of which can be illuminated.

2. Description of the Prior Art

A conventional keyboard includes, for example, a keyboard body in which numerous key switches are mounted, and a case which internally houses and holds the keyboard and from which the keytops of the key switches are exposed so that they can be manipulated. As the case, for example, a case consisting of a combination of an upper case and a lower case is adopted wherein the upper case covers the top face of the keyboard body and has window portions to expose a large number of keytops, and the lower case covers the bottom face of the keyboard body. The keyboard body has several types of key groups each having a different function such as normal input keys, ten-keys, function keys, and the like wherein these key groups are separated from each other by beam portions between the window portions of the upper case and placed at some distance away from each other.

In such a keyboard, there have been cases where only specific keys such as, e.g., a CAPS key are provided inside the relevant keytops with a lighting means such as LED (light-emitting diode) so that they can be lighted.

However, recently, with widespread use of portable personal computers such as a notebook-sized personal computer in which a keyboard and a computer body are integrated, the portable personal computers have been widely used among general users as communication terminals for Internet, electronic mails, and the like. In such a situation, there may be a case where the keyboard of a portable personal computer or the like is manipulated when the surroundings are dark and short of sufficient light, e.g., during travelling. There has been a problem in that the key positions of the keyboard are difficult to recognize in such a case.

The provision of a lighting means such as LED inside a keytop has been made to indicate the state of specific operations (e.g., ON/OFF state of a CAPS key), not to illuminate the operation side of the keyboard, therefore not providing a solution to the above problem.

Furthermore, there is an increasing demand to differentiate products by placing greater emphasis on design attributes such as appearance than on functionability in both of notebook-sized personal computers and desktop personal computers.

SUMMARY OF THE INVENTION

The present invention has been made in view of the above circumstances, and intends to achieve at least one of the objects described below.

(1) Increasing the recognizability of key positions on the operation side of the keyboard apparatus.

(2) Increasing the operability of the keyboard apparatus.

(3) Increasing design attributes and fashionability to provide a keyboard apparatus meeting market needs.

The present invention has solved the above problem by including a plurality of key switches manipulated by keytops and a backlight means for illuminating the operation side constituted of the keytops from under it.

According to the present invention, since the operation side constituted of the keytops of the keyboard can be illuminated, even when ambient light is insufficient, the keyboard apparatus can be easily manipulated.

According to the present invention, the backlight means can be constructed to comprise an EL (electroluminescent device) sheet.

According to the present invention, the use of the EL sheet provides sufficient illumination at low power and also provides the keyboard with increased recognizability of key positions and illumination capability thanks to lighting from inside the keyboard, and further increased design attributes and fashionability, bringing about an upscale image.

In the present invention, the backlight means can have light emission positions thereof allocated corresponding to the positions of the key switches.

According to the present invention, by providing the EL sheet with light emission portions only in portions necessary to recognize the keytops by methods such as screen printing, manufacturing costs can be reduced, compared with the case where a backlight means having a light emission portion corresponding to the entire operation side is provided.

In this case, for example, the EL sheet can have light emission portions allocated so that the keytops are illuminated from outside them to make the plane contours of the keytops recognizable. To be more specific, the EL sheet can have through holes corresponding to the positions of key switches, and the through holes can be made into a nearly circular shape or a nearly rectangular shape.

According to the present invention, in this case, since the plane contours of the keytops can be recognized, key positions can be recognized and manufacturing costs can be reduced by reducing the area of light emission portions of the EL sheet.

Furthermore, the EL sheet can have light emission portions corresponding to the positions of the key switches so that the keytops are illuminated from inside them.

According to the present invention, in this case, since the keytops are illuminated from inside them, key positions can be recognized and manufacturing costs can be reduced by reducing the area of light emission portions of the EL sheet.

In the present invention, when the keytops are illuminated from inside them, the key switches can be provided with permeable keytops so as to transmit light from under the keytops, and the keytops can be provided with impermeable character portions so as not to transmit light from under the keytops so that key types can be recognized.

According to the present invention, by illuminating the keytops from inside them, the key positions can be recognized, and by illuminating the operation side of the keyboard, illumination capabilities can be provided, design attributes can be increased, key types can be recognized, and operability can be increased.

Also, in the present invention, when the keytops are illuminated from inside them, the key switches can be provided with impermeable keytops so as not to transmit light from under the keytops, and the keytops can be provided with permeable character portions so as to transmit light from under the keytops so that key types can be recognized.

According to the present invention, by illuminating the keytops from inside them, the operation side can be illuminated from the character portions of the keys, key positions can be recognized, illumination capabilities can be provided, key types can be recognized, and operability can be increased.

Furthermore, the backlight means can be controlled as to its light emission, corresponding to key placements. Here are specific examples of it: light emission can be partially controlled in light emission portions arbitrarily allocated along the row or columnar direction of key layout; by an intermittent light emission signal provided for change of the state of a connected power source or warning messages for operation mistakes, control can be performed so that light is intermittently emitted according to a specified length of light emission or a specified brightness level; and the types of luminescent colors in light emission positions can be set.

In this case, by controlling light emission at split light emission portions, messages or the like can be indicated to an operator, and at the same time illumination capabilities can be provided and design attributes and fashionability can be increased.

The keyboard apparatus of the present invention not only can be used as a keyboard of a desktop personal computer but also can be mounted in notebook-sized personal computers, communication terminals for Internet and electronic mail, portable calculators, portable electronic terminals such as portable telephones, control panel of electronic lock keys, and electronic equipment potentially used in dark places, such as terminals for reading electricity and gas meters.

Thereby, operability can be increased, illumination capabilities can be provided, and furthermore, design attributes and fashionability can be increased.

In the present invention, the keyboard apparatus has a cover and is mounted in a notebook-sized personal computer which can be powered on or off by opening or closing the cover, and also the backlight means can be turned on when the cover is opened.

With this construction, when the cover is opened to use the notebook-sized personal computer, that is, when an operator starts to use it, the operation side constituted of the keytops of the keyboard apparatus can be illuminated. Therefore, even when ambient light is insufficient, the keyboard apparatus and the notebook-sized personal computer provided therewith can be manipulated. Furthermore, when the cover of the notebook-sized personal computer in use is closed, that is, when the operator terminates its use, the illumination of the operation side can be turned off. In these cases, the notebook-sized personal computer can be provided with illumination capabilities, and design attributes and fashionability can be increased.

DESCRIPTION OF THE PREFERRED EMBODIMENTS

Hereinafter, a first embodiment of a keyboard apparatus according to the present invention will be described based on the accompanying drawings.

Figure 1:
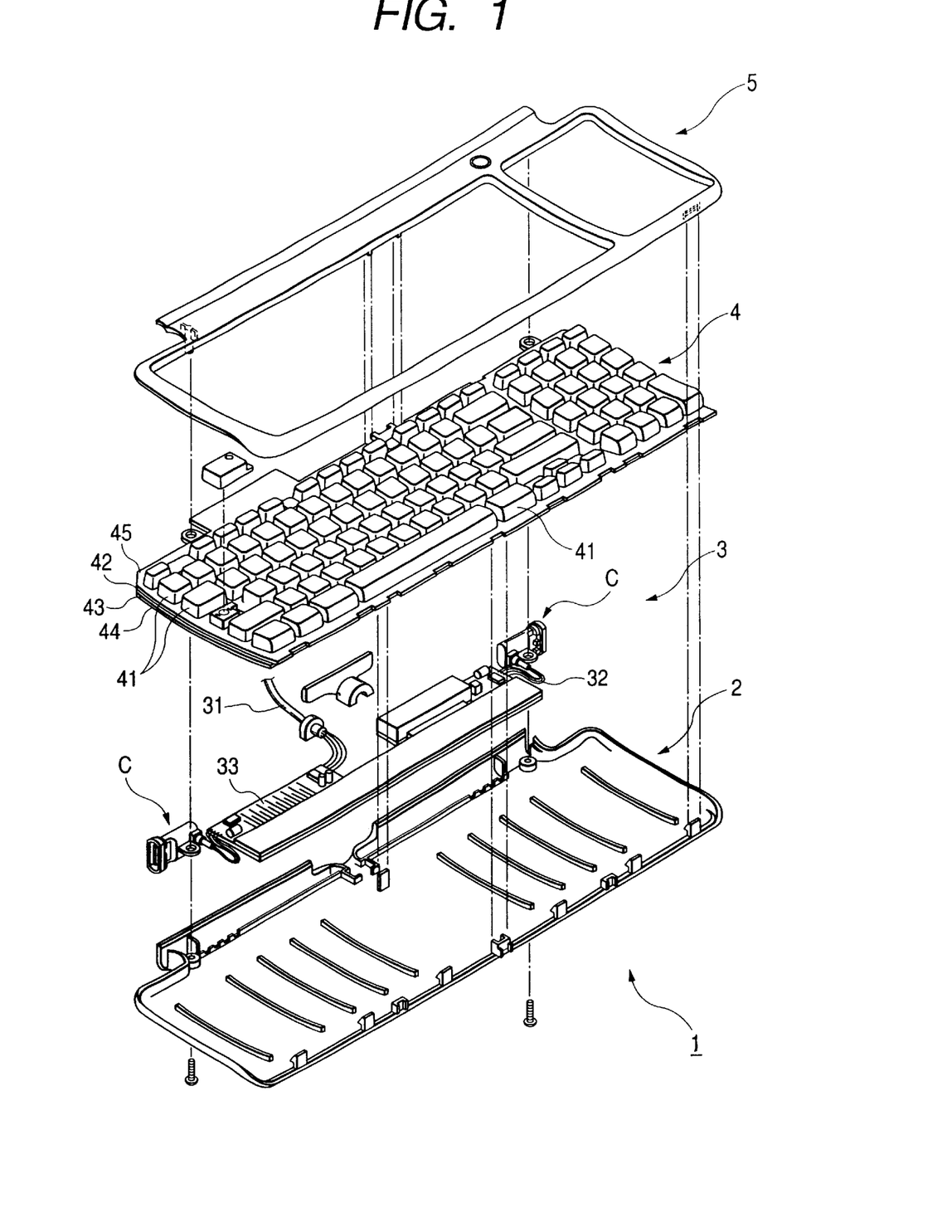
FIG. 1 is an exploded perspective view of a keyboard apparatus of a first embodiment according to the present invention.
Figure 2:
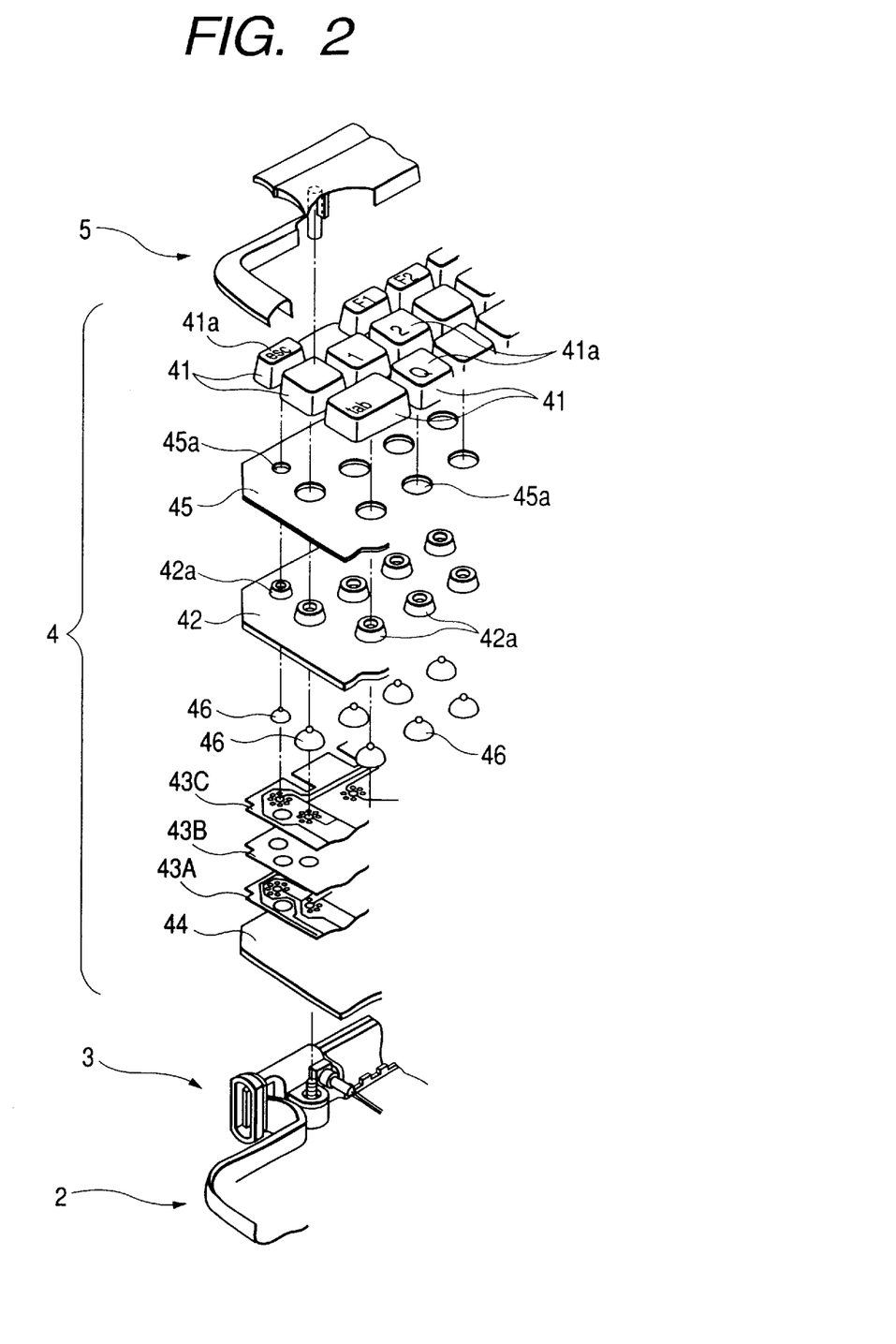
FIG. 2 is an enlarged perspective view showing a state of assembly of connectors, keyboard body, EL sheet, and the like in FIG. 1.
Figure 3:
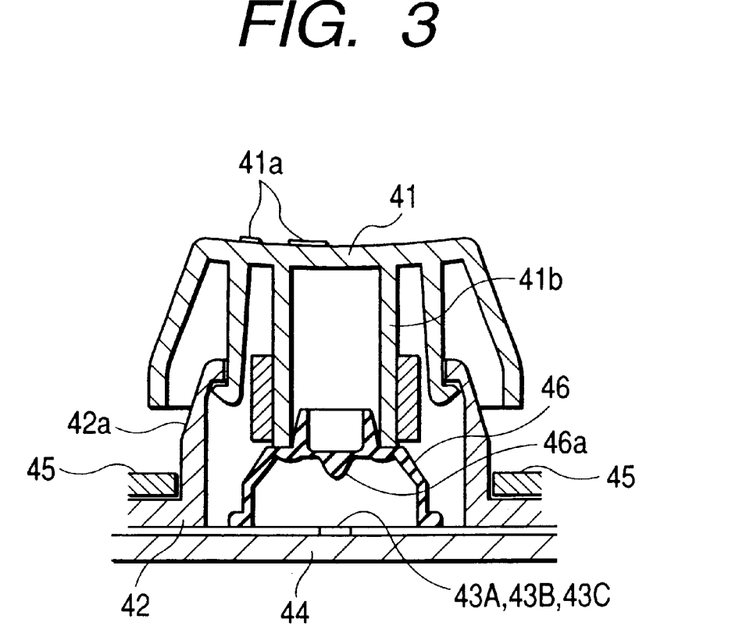
FIG. 3 is a cross-sectional view of the key switch in FIG. 1.
Figure 4:
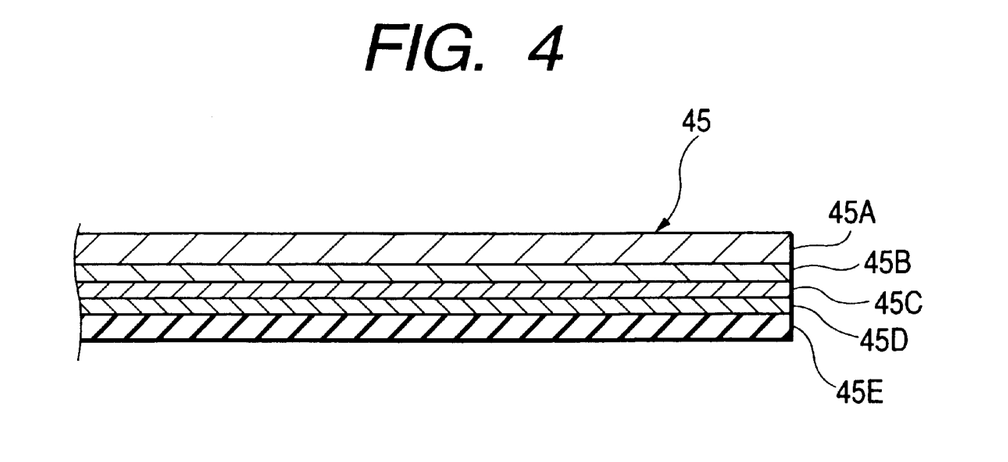
FIG. 4 is a cross-sectional view of the EL sheet in FIG. 1.
Figure 5:
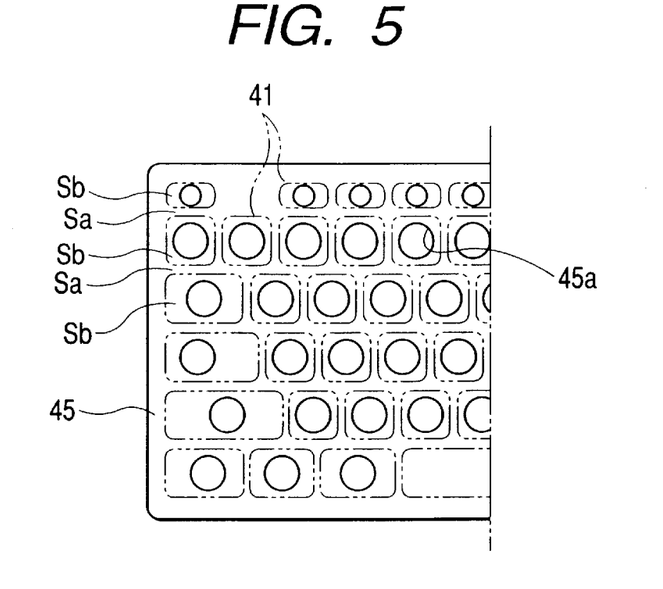
FIG. 5 is a plan view of the EL sheet, keytops, and housing of FIG. 1.
Figure 6:
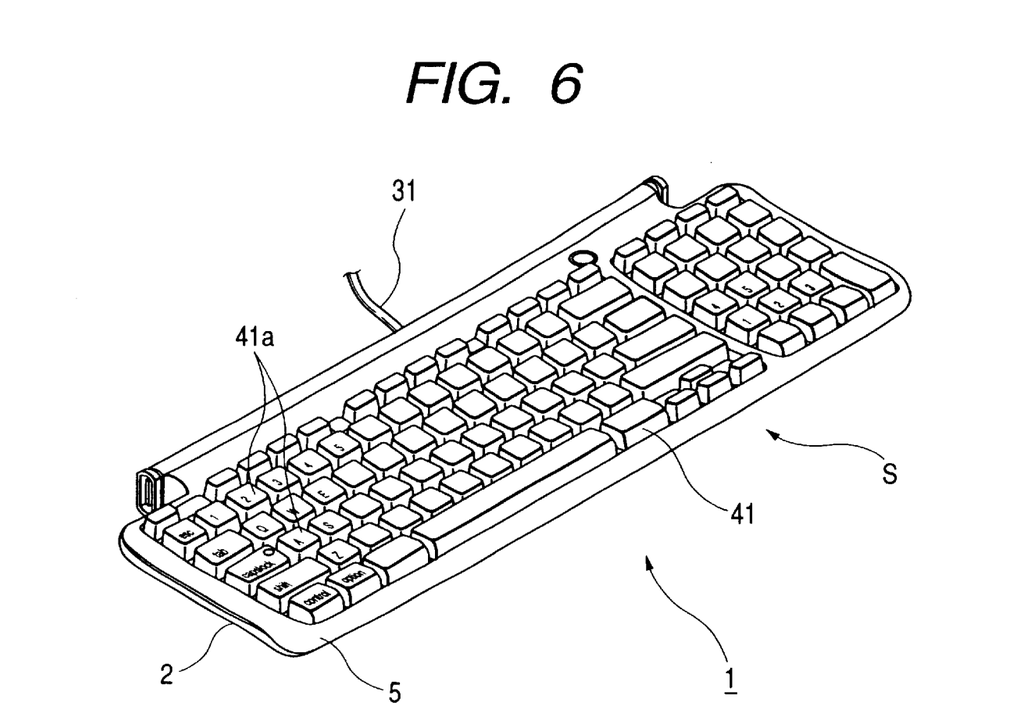
FIG. 6 is a perspective view of the keyboard apparatus according to the present invention.
Figure 7:
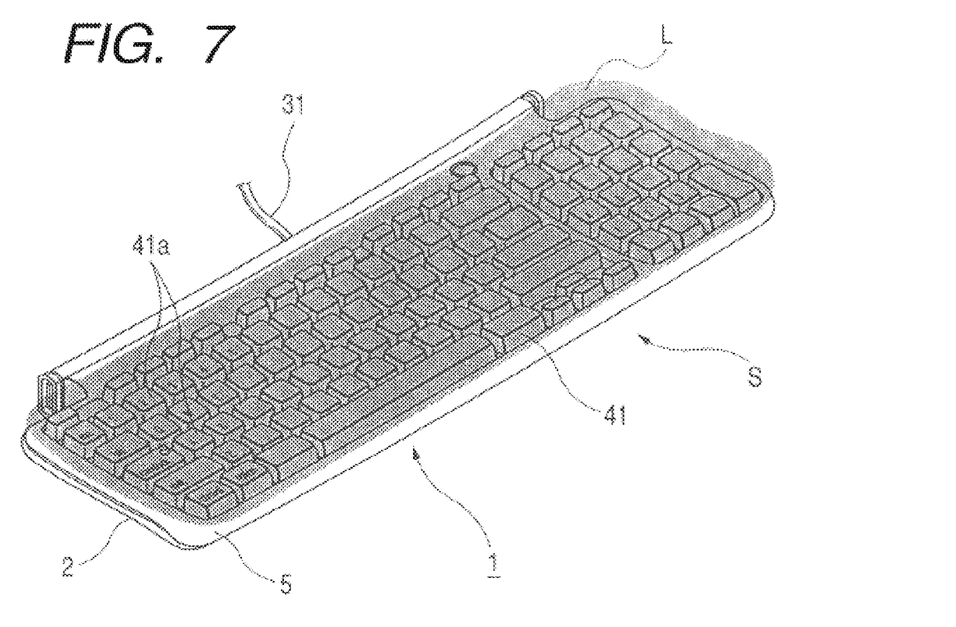
FIGS. 7 is a perspective view of an illuminated keyboard apparatus of the first embodiment according to the present invention.
Figure 8:
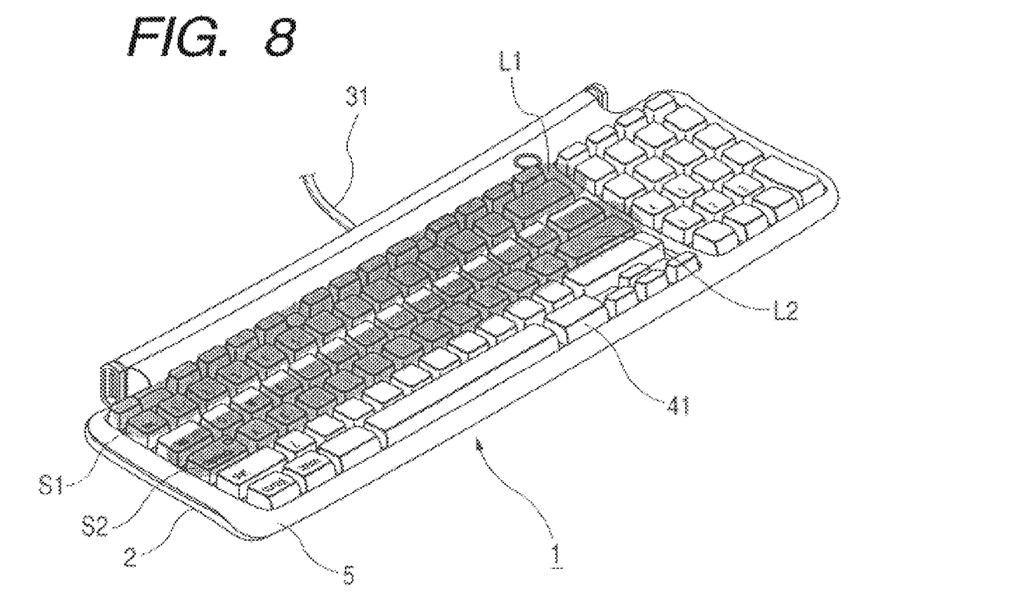
FIGS. 8 is a perspective view of an illuminated keyboard apparatus of the first embodiment according to the present invention.

FIG. 1 is an exploded perspective view of a keyboard apparatus of the first embodiment. FIG. 2 is an enlarged perspective view showing a state of assembly of connectors, keyboard body, EL sheet, and the like. FIG. 3 is a cross-sectional view of a key switch. FIG. 4 is a cross-sectional view of an EL sheet. FIG. 5 is a plan view of the EL sheet, keytops, and housing of FIG. 1. FIG. 6 is a perspective view of the keyboard apparatus of the first embodiment. FIGS. 7 and 8 are perspective views of illuminated keyboard apparatuses of the first embodiment.

In FIG. 1 or 6, the reference numeral 1 designates a keyboard apparatus; 2, a lower case; 3, a control part; 4, a keyboard body; and 5, an upper case.

A keyboard apparatus of the embodiment is, for example, a keyboard apparatus of a type connected to a desktop main computer.

Furthermore, the keyboard apparatus 1 of the embodiment, as shown in FIG. 1, includes: the keyboard body 4 having keytops 41 of a plurality of key switches; connectors C for connecting the keyboard body 4 and an external apparatus not shown; the control part 3 having C for controlling signals of the keyboard body 4; and the upper and lower cases 2 and 5 for covering the control part 3 and the keyboard body 4 so that the keytops 41 can be manipulated, wherein these are assembled as shown in FIGS. 1 and 2.

The control part 3, located at the back edge of the lower case 2 as shown in FIGS. 1 and 2, includes: a cord 31 provided at the central part thereof, for connection with a main computer; connectors C connected by wirings 32 at both ends thereof; a connection part 33 for electrical connection with the keyboard body 4; and a power switch of the main computer.

The keyboard body 4, as shown in FIGS. 1 and 2, includes a plurality of key switches manipulated by the keytops 41 wherein the key switches include a housing 42 on which a plurality of keytops 41 are mounted; membrane sheets 43A, 43B, and 43C on which switch circuits are printed; and a metal plate 44 for sandwiching the membrane sheets 43A, 43B, and 43C in conjunction with the housing 42.

The keyboard body 4 is provided with a backlight means for illuminating an operation side S constituted of the keytops 41 from under it wherein the backlight means comprises an EL (Electroluminescent Device) sheet 45 to be described later.

The keytop 41, which is made of a permeable material so as to transmit light from under the keytop 41 as shown in FIGS. 2 and 3, is provided on the surface thereon with an impermeable character portion 41a so as not to transmit light from under the keytop 41 wherein the character portion is printed by laser printing or the like so that a key type can be recognized. The keytop 41 is attached to the housing 42 and has a stem part 41b contacting on a rubber spring 46.

On the housing 42 are provided at positions corresponding to the keys a plurality of seats 42a into which the stem part 41b is slidably inserted and which control movement positions of the keytops 41. The EL sheet 45 is placed on the top surface of the housing 42.

Switch circuits are printed on the membrane sheets 43A, 43B, and 43C, each of which forms a membrane switch.

The rubber spring 46 has elastic repulsion so that it deforms when a keytop 41 is pressed with a finger and it can return the keytop 41 to its original position when the keytop 41 is released from the finger pressure. As shown in FIG. 3, the rubber spring 46 has a pressing part 46a projecting inward which can press the membrane switches. The rubber spring 46 is placed at a lower location of the seat 42a of the housing 42.

A key switch, as shown in FIG. 3, when a keytop 41 is pressed with a finger, presses, by the pressing part 46a, the membrane sheets 43A, 43B, and 43C forming the membrane switches so that the membrane switches are brought into conduction, while when the keytop 41 is released from the finger pressure, it is returned to its original position by the elastic repulsion of the rubber spring 46 and the switches are brought out of conduction.

The EL sheet 45 is, as shown in FIGS. 2 and 3, provided on top of the housing 42, and a through hole 45a penetrating a seat 42a is provided at a portion of the housing 42, corresponding to the seat 42a.

The following layers are stacked on the EL sheet 45 secuentially from the surface thereof as shown in FIG. 4: a transparent electrode layer 45A made from ITO (indium tin oxide); a fluorescent layer 45B containing chiefly ZnS (zinc sulfide) and a small amount of Cu (copper); a dielectric layer 45C; a back electrode layer 45D; and an isolation resist layer 45E. Applying an AC voltage to the transparent electrode layer 45A on the surface and the back electrode layer 45D on the back generates an electric field in fluorescent powder, on receiving the energy, electrons are excited from a base state, and fluorescence is generated when the electrons return to the base state again. According to such an EL sheet 45, surface light emission having uniform brightness and uniform color tone can be obtained.

The EL sheet 45 is connected to the main computer via the connection part 33 of the control part 3 to apply AC voltages to the transparent electrode layer 45A and the back electrode layer 45D, and is controlled as to its light emission by the main computer, corresponding to key placements to be described later.

The EL sheet (backlight means) 45 has light emission positions thereof allocated corresponding to the positions of keytops 41 of the key switches.

Furthermore, as shown in FIG. 5, the EL sheet 45 has light emission portions allocated so that the keytops 45 are illuminated from outside positions Sa thereof to make the plane contours of the keytops 41 recognizable. To be more specific, the EL sheet 45 has through holes 45a corresponding to the positions of keytops 41. The through holes are made into a nearly circular shape as shown in FIGS. 2 and 5. The through holes 45a can be made into not only the nearly circular shape shown in FIG. 5 but also a nearly rectangular shape or the like along the plane contours of the keytops 41.

The EL sheet 45, as shown in FIG. 5, has light emission portions allocated at lower positions of the keytops 41, corresponding to the positions of the keytops 41 so that the keytops 41 are illuminated from inside positions Sb thereof. The light emission portions at outside positions Sa of the keytops 41 and the light emission portions at inside positions Sb of the keytops 41 can be continuously allocated.

Such an EL sheet 45 is formed by cutting out the through holes 45a after a transparent electrode layer 45A, a fluorescent layer 45B, a dielectric layer 45C, a back electrode layer 45D, and an isolation resist layer 45E are stacked by screen printing in this order only in locations required as light emission portions on a transparent sheet made of a plastic material such as, e.g., PET. During printing to form the light emission portions, by setting printing positions of the fluorescent layer 45B, light emission positions of the EL sheet are set. Furthermore, at this time, when partially controlling light emission portions to be described later, a control circuit or the like for each light emission portion can also be printed.

In such a keyboard apparatus 1, the EL sheet 45 emits light under control of the main computer via the control part 3, as previously described. Since the light emitted from the EL sheet 45 illuminates each keytop 41 from an outside position Sa thereof, the operation side S of the keyboard apparatus 1 constituted of the keytops 41 can be illuminated. Accordingly, the plane contours of each keytop 41 can be recognized.

At the same time, since light emitted from an inside position Sb of each keytop passes through the keytop 41, the key position can be recognized and an impermeable character portion 41a looks dark on the bright surface of the keytop 41, so that the key type of the keytop 41 can be recognized and operability can be increased.

The entire operation side S illuminated from inside the keyboard apparatus 1 as described above is shown in FIG. 7.

At this time, since the entire operation side S can be illuminated from inside the keyboard apparatus 1, even when the surroundings of the keyboard apparatus 1 are dark and short of sufficient light, key positions and key types can be easily recognized thanks to the light emission portion L, so that the usability of the keyboard apparatus 1 in a dark place can be increased.

Also, illumination of the operation side S of the keyboard apparatus 1 by the light emission portion L provides the keyboard apparatus 1 with illumination capabilities, offering increased design attributes and fashionability and bringing about an upscale image.

According to this embodiment, the use of the EL sheet 45 provides sufficient illumination at low power and also provides the keyboard with increased recognizability of key positions and illumination capability thanks to lighting from inside the keyboard, and further increased design attributes and fashionability, bringing about an upscale image. At the same time, increased amusement attributes make it possible to provide a purchase layer fond of such amusing products with products differentiated to meet their needs.

In this embodiment, the EL sheet 45 has light emission positions thereof allocated corresponding to the positions of keytops 41. By providing light emission portions for the EL sheet 45 by through holes 45a only in portions necessary to recognize the keytops 41, manufacturing costs can be reduced, compared with the case where the EL sheet is placed on the entire operation side S.

The EL sheet 45 can be controlled with respect to its light emission, corresponding to the placement of keytops 41. As a specific example, as shown in FIG. 8, the light emission of light emission portions L1, L2, and so forth can be controlled for each of the operation sides S1, S2, and so forth set along the row direction of keytop 41 layout, and the light emission portions L1, L2, and so forth are controlled so as to go on alternately or sequentially with regularity or as a random state and thereby can be put into a state effective for eye catch or the like. Control of the light emission of the light emission portions in combination of them would enable other numerous applications.

As another example, as shown in FIG. 7, the entire operation side S can be cyclically blinked. By an intermittent light emission signal provided for change of the state of connected power source or warning messages for operation mistakes, control can be performed so that light is intermittently emitted. For this reason, if the keyboard apparatus is mounted in a portable electronic terminal integrated with a power source such as a notebook-sized personal computer, the states of power could be indicated to the operator.

The setting of light emission positions is within the scope of the present invention, and the following settings, in addition to the setting described above, are possible: setting of light emission portions along the columnar direction of key layout; and controlling the light emission cycle, light brightness, light emission interval, and the like. Furthermore, by signals in predetermined states such as at power-on time, predetermined light emission states, in addition to intermittent light emission, can be produced.

Furthermore, by changing Cu (copper) of the composition of the fluorescent layer 45B to Mg (magnesium), a whity blue luminescent color can be changed to an orangy, whity color. By performing predetermined painting on the surface of the EL sheet 45, an arbitrary luminescent color can be obtained. In addition to this method, by various techniques, the types of luminescent colors at each light emission position can be set.

As has been described above, according to this embodiment, by controlling light emission at light emission portions of the EL sheet 45, messages or the like can be indicated to an operator, and at the same time illumination capabilities can be provided, and furthermore, design attributes and fashionability can be increased.

In this embodiment, the keytops 41 are made of a permeable material so as to transmit light from under the keytops 41 and are provided on the surface thereon with impermeable character portions 41a so as not to transmit light from under the keytops 41 so that key types can be recognized. However, the key switches can be provided with impermeable keytops so as not to transmit light from under the keytops, and in this case, the keytops can be provided with permeable character portions so as to transmit light from under the keytops so that key types can be recognized.

In this case, by illuminating the keytops from inside them, a character portion of each key looks floated from the operation side, so that key positions can be recognized, illumination capabilities can be provided, key types can be more correctly recognized, and operability can be increased.

Furthermore, in the present invention, since the keyboard apparatus is skeletonized as a transparent keyboard apparatus by constructing the cases 2 and 5 from permeable materials, the entire keyboard apparatus as well as the operation side formed by the keytops can be illuminated from inside it, and amusement attributes can be increased, contributing to differentiation of products.

By providing the permeable housing 42 and placing the EL sheet 45 not provided with through holes 45a between the housing 42 and the membrane sheet 43A, stroke sound produced between the system part 41b and the metal plate 44 can be reduced.

The keyboard apparatus of the present invention is applicable to various constructions in addition to the above-described construction. It not only can be used as a keyboard of a desktop personal computer but also can be mounted in notebook-sized personal computers, communication terminals for Internet and electronic mail, portable calculators, portable facsimiles, portable electronic terminals such as portable telephones, control panel of electronic lock keys, and electronic equipment potentially used in dark places, such as terminals for reading electricity and gas meters.

Thereby, operability can be increased, illumination capabilities can be provided, and furthermore, design attributes and fashionability can be increased.

As a backlight means, in addition to the EL sheet 45, which is employed in this embodiment, any construction which permits the operation side of the keyboard to be illuminated from inside it is permitted, such as LED (light-emitting diode) and combinations of cool-cathode tube and light guide plate as used in the backlight of a liquid crystal panel.

Hereinafter, a second embodiment of a keyboard apparatus according to the present invention will be described based on the accompanying drawings.

Figure 9:
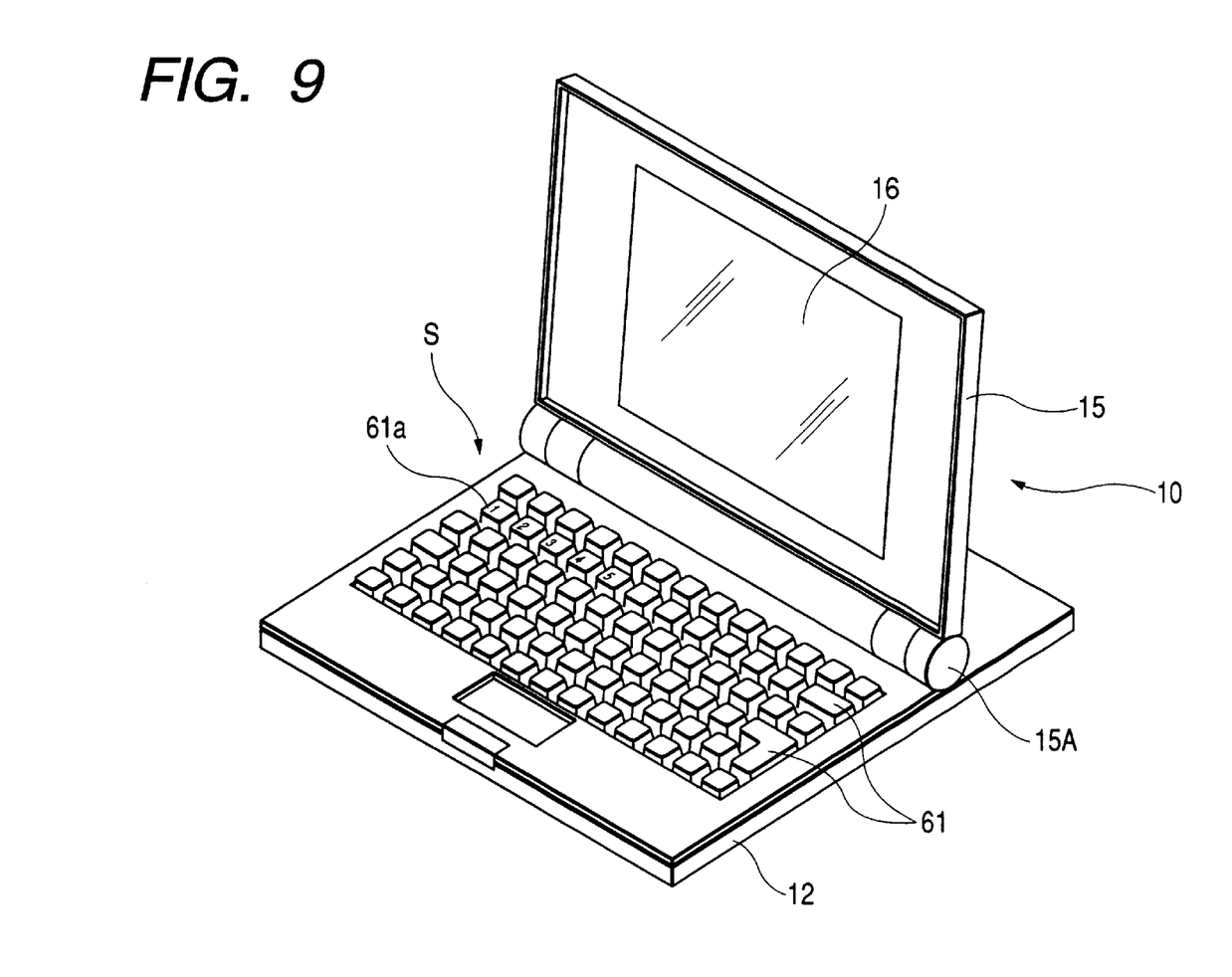
FIG. 9 is a perspective view of a notebook-sized personal computer in which a keyboard apparatus of a second embodiment according to the present invention is mounted.
Figure 10:
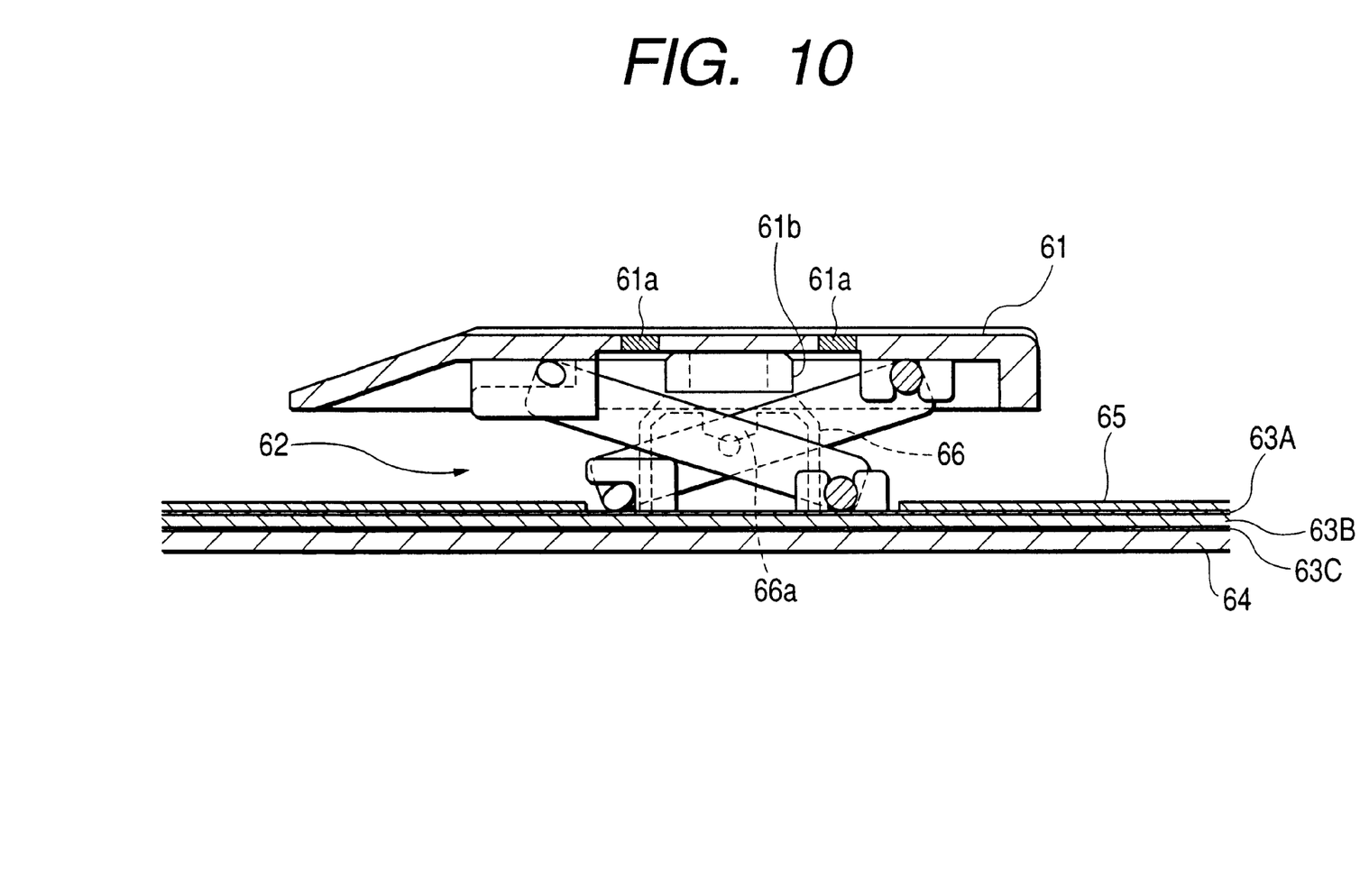
FIG. 10 is a cross-sectional view of a key switch and an EL sheet in FIG. 9.

FIG. 9 is a perspective view of a notebook-sized personal computer in which the keyboard apparatus of this embodiment is mounted. FIG. 10 is a cross-sectional view of a key switch and an EL sheet in this embodiment.

In FIGS. 9 and 10, the reference numeral 10 designates a notebook-sized personal computer.

The keyboard apparatus of this embodiment is an integral-type one mounted, for example, in a notebook-sized personal computer.

The notebook-sized personal computer 10, as shown in FIG. 9, includes a cover 15 that can be opened and closed for a body 12 by a hinge 15A, and the keytops 61 of a plurality of key switches wherein a display part 16 such as a liquid crystal panel is provided inside the cover 15 and the power to the notebook-sized personal computer 10 can be turned on or off according to whether the cover 15 is opened or closed.

The keytops 61, as shown in FIG. 9, constitute the operation side S of the keyboard, and a plurality of key switches manipulated by these keytops 61 include: a metal plate 64, secured to the notebook-sized personal computer 10, on which the respective keytops 61 are mounted; membrane sheets 63A, 63B, and 63C on which switch circuits are printed; and a movement control part 62 for attaching the keytops 61 to the metal plate 64 and controlling movement positions of the keytops 61. These components correspond to the keyboard body of the first embodiment as shown in FIGS. 1 to 8.

The notebook-sized personal computer 10 is provided with a backlight means for illuminating the operation side S constituted of the keytops 61 from under it, and the backlight means comprises an EL (Electroluminescent Device) sheet 65 like that in the first embodiment shown in FIG. 1 or 8.

The keytop 61, which is made of an impermeable material so as not to transmit light from under the keytop 61 as shown in FIG. 10, is provided with a permeable character portion 61a so as to transmit light from under the keytop 61 so that a key type can be recognized. The keytop 61 is attached to the metal plate 64 by the movement control part 62 so that it is vertically and freely movable, and has a step part 61b contacting on a rubber spring 66.

The movement control part 62 is rotatably and slidably attached to the metal plate 64 as shown in FIG. 10 and is constructed in a link mechanism shape like a so-called pantograph to control vertical movement positions of the keytops 61.

Switch circuits are printed on the membrane sheets 63A, 63B, and 63C, each of which forms a membrane switch.

The rubber spring 66 has elastic repulsion so that it deforms when a keytop 61 is pressed with a finger and it can return the keytop 61 to its original position when the keytop 61 is released from the finger pressure. The rubber spring 66 has a pressing part 66a projecting inward which can press the membrane switches.

A key switch, when a keytop 61 is pressed with a finger, presses, by the pressing part 66a, the membrane sheets 63A, 63B, and 63C forming the membrane switches so that the membrane switches are brought into conduction, while when the keytop 61 is released from the finger pressure, it is returned to its original position by the elastic repulsion of the rubber spring 66 and the switches are brought out of conduction at the same time.

The EL sheet 65 is, as shown in FIG. 10, provided on top of the membrane sheets 63A, 63B, and 63C, and a through hole penetrating the membrane sheets is provided at a portion of the EL sheet 65, corresponding to the movement control part 62 of each keytop 61.

The EL sheet 65 is the equivalent of the EL sheet 45 shown in the first embodiment previously described. The following layers are stacked on the EL 65 sheet sequentially from the surface thereof: a transparent electrode layer ITO (indium tin oxide); a fluorescent layer containing chiefly ZnS (zinc sulfide) and a small amount of Cu (copper); a dielectric layer; a back electrode layer; and an isolation resist layer. Applying an AC voltage to the transparent electrode layer on the surface and the back electrode layer on the back generates an electric field in fluorescent powder, on receiving the energy, electrons are excited from a base state, and fluorescence is generated when the electrons return to the base state again. According to such an EL sheet 65, surface light emission having uniform brightness and uniform color tone can be obtained.

The EL sheet 65 is connected to the control part of the notebook-sized personal computer 10 to apply AC voltages to the transparent electrode layer and the back electrode layer, and is controlled as to its light emission by the control part.

The EL sheet (backlight means) 65 has light emission positions thereof allocated corresponding to the positions of keytops 61 of the key switches.

Furthermore, the EL sheet 65 has light emission portions allocated so that the keytops 61 are illuminated from outside positions thereof to make the plane contours of the keytops 61 recognizable. To be more specific, the EL sheet 65 has through holes corresponding to the positions of keytops 61. The through holes are made into a nearly circular shape as shown in FIGS. 2 and 5. The through holes can be made into a nearly rectangular shape or the like along the plane contours of the keytops 61.

The EL sheet 65, as shown in FIG. 10, has light emission portions allocated at lower positions of the keytops 61, corresponding to the positions of the keytops 61 so that the keytops 61 are illuminated from inside them. The light emission portions at outside positions of the keytops 61 and the light emission portions at inside positions of the keytops 61 can be continuously allocated.

In the notebook-sized personal computer 10 provided with such a keyboard apparatus, the EL sheet 65 emits light under control of the control part. Since the light emitted from the EL sheet 65 illuminates each keytop 61 from an outside position thereof, the operation side S of the keyboard apparatus 1 constituted of the keytops 61 can be illuminated. Accordingly, the plane contours and key position of each keytop 61 can be recognized.

At the same time, since light emitted from an inside position of each keytop 61 passes through the character portion 61a of the keytop 61 and the character portion 61a looks floated on the dark surface of the keytop 61, the key type of the keytop 61 can be recognized and operability can be increased.

At this time, since the entire operation side S can be illuminated from inside the keyboard apparatus, even when the surroundings of the keyboard apparatus are dark and short of sufficient light, key positions and key types can be easily recognized, so that the usability of the keyboard apparatus in a dark place can be increased.

Also, illumination of the operation side S of the keyboard apparatus provides the keyboard apparatus with illumination capabilities, offering increased design attributes and fashionability and bringing about an upscale image.

In this embodiment, the keyboard apparatus has the cover 15 and is mounted in a notebook-sized personal computer 10 which can be powered on or off by opening or closing the cover 15, and also the backlight means can be turned on or off by the control part according to whether the cover 15 is opened or closed.

With this construction, when the cover 15 is opened to use the notebook-sized personal computer 10, that is, when an operator starts to use it, the operation side S constituted of the keytops 61 of the keyboard apparatus can be illuminated. Therefore, even when ambient light is insufficient, the keyboard apparatus and the notebook-sized personal computer 10 provided therewith can be easily manipulated. Also, when the cover 15 is closed, that is, when the operator terminates its use, the illumination of the operation side S can be turned off, so that the notebook-sized personal computer 10 can save power to increase continuous use capacity, the notebook-sized personal computer 10 can be provided with illumination capabilities, and design attributes and fashionability can be increased.

Furthermore, as in the first embodiment previously described, the backlight means can be controlled with respect to its light emission, corresponding to key placements. Also in this case, of course, the same effect as in the first embodiment can be obtained.

The keyboard apparatus according to the present invention brings about the following effects:

(1) Since the keyboard apparatus has a plurality of key switches manipulated by keytops and has a backlight means for illuminating the operation side constituted of the keytops from under it, even when ambient light is insufficient, the keyboard can be easily manipulated and the recognizability of key positions on the operation side of the keyboard can be increased with the result that the operability of the keyboard can be increased.

(2) The backlight means, which comprises an EL sheet, provides sufficient illumination at low power and also increased recognizability of key positions and illumination capability thanks to lighting from inside the keyboard, and further increased design attributes and fashionability, making it possible to provide keyboard apparatuses meeting market needs.

(3) Furthermore, since the EL sheet is laid only in portions necessary to recognize the keytops by setting light emission positions and providing through holes, manufacturing costs can be reduced, compared with the case where the EL sheet is laid on the entire operation side.

(4) Since the key switches are provided with permeable keytops and impermeable character portions or impermeable keytops and permeable character portions, the recognizability of key positions is increased. Also, by illuminating the operation side of the keyboard, illumination capabilities can be provided, key types can be recognized, and operability can be increased.

(5) If the backlight means can be controlled with respect to its light emission, corresponding to key placements, operability is increased, messages and the like can be indicated to an operator, and design attributes, fashionability, and amusement attributes can be increased.

(6) The keyboard apparatus of the present invention is mounted in a notebook-sized personal computer having a cover and, when the cover is opened, the backlight means can be turned on. Therefore, when the cover is opened to use the notebook-sized personal computer, that is, when an operator starts to use it, the operation side constituted of the keytops of the keyboard apparatus can be illuminated. Therefore, even when ambient light is insufficient, the keyboard apparatus and the notebook-sized personal computer provided therewith can be manipulated and also the notebook-sized personal computer can be provided with illumination capabilities, offering increased design attributes and fashionability.

What is claimed is:

1. A keyboard apparatus for a desk-top computer comprising a housing and a plurality of manually operated key switches, each key switch being slidably supported by a seat on the housing and having a keytop, an operation side of each of the keytops being illuminated from underneath by a backlight mechanism, wherein said backlight mechanism comprises an electroluminescent (EL) sheet placed on a top surface of the housing, said EL sheet having through holes corresponding to the positions of the key switches, said through holes permitting the seats on the housing to extend upwardly through the EL sheet, wherein said EL sheet has light emission portions corresponding to an area beneath each of the key switches, said light emission portions being formed by screen print stacking a transparent electrode layer, a fluorescent layer, a dielectric layer, a back electrode layer, and an isolation resist layer on a transparent sheet, and wherein the operation side of each of said keytops comprises a field portion and a character portion, said field portion being made of a light permeable material and said character portion being made of a light impermeable material so as to permit a transmission of light from said light emission portions through the field portion but not through the character portion.

2. The keyboard apparatus according to claim 1, wherein said EL sheet has secondary light emission portions corresponding to an area between each of the key switches so as to illuminate a plane contour of the key switches.

3. The keyboard apparatus according to claim 2, wherein said secondary light emission portions are illuminated in a sequenced or randomized pattern so as to so as to only illuminate areas adjacent to fewer than all of the plurality of key switches.

4. The keyboard apparatus according to claim 1, wherein said light emission portions are illuminated in a sequenced or randomized pattern so as to so as to only illuminate fewer than all of the plurality of key switches.

5. A keyboard apparatus for a desk-top computer comprising a housing and a plurality of manually operated key switches, each key switch being slidably supported by a seat on the housing and having a keytop, an operation side of each of the keytops being illuminated from underneath by a backlight mechanism, wherein said backlight mechanism comprises an electroluminescent (EL) sheet placed on a top surface of the housing, said EL sheet having through holes corresponding to the positions of the key switches, said through holes permitting the seats on the housing to extend upwardly through the EL sheet, wherein said EL sheet has light emission portions corresponding to an area beneath each of the key switches, said light emission portions being formed by screen print stacking a transparent electrode layer, a fluorescent layer, a dielectric layer, a back electrode layer, and an isolation resist layer on a transparent sheet, and wherein the operation side of each of said keytops comprises a field portion and a character portion, said field portion being made of a light impermeable material and said character portion being made of a light permeable material so as to permit a transmission of light from said light emission portions through the character portion but not through the field portion.

6. The keyboard apparatus according to claim 5, wherein said EL sheet has secondary light emission portions corresponding to an area between each of the key switches so as to illuminate a plane contour of the key switches.

7. The keyboard apparatus according to claim 6, wherein said secondary light emission portions are illuminated in a sequenced or randomized pattern so as to so as to only illuminate areas adjacent to fewer than all of the plurality of key switches.

8. The keyboard apparatus according to claim 5, wherein said light emission portions are illuminated in a sequenced or randomized pattern so as to so as to only illuminate fewer than all of the plurality of key switches.

9. A keyboard apparatus incorporated into a portable notebook type personal computer comprising a housing and a plurality of manually operated key switches, each key switch being slidably supported by a seat on the housing and having a keytop, an operation side of each of the keytops being illuminated from underneath by a backlight mechanism, wherein said backlight mechanism comprises an electroluminescent (EL) sheet placed on a top surface of the housing, said EL sheet having through holes corresponding to the positions of the key switches, said through holes permitting the seats on the housing to extend upwardly through the EL sheet, wherein said EL sheet has light emission portions corresponding to an area beneath each of the key switches, said light emission portions being formed by screen print stacking a transparent electrode layer, a fluorescent layer, a dielectric layer, a back electrode layer, and an isolation resist layer on a transparent sheet, and wherein the operation side of each of said keytops comprises a field portion and a character portion, said field portion being made of a light permeable material and said character portion being made of a light impermeable material so as to permit a transmission of light from said light emission portions through the field portion but not through the character portion.

10. The keyboard apparatus according to claim 9, wherein said EL sheet has secondary light emission portions corresponding to an area between each of the key switches so as to illuminate a plane contour of the key switches.

11. The keyboard apparatus according to claim 10, wherein said secondary light emission portions are illuminated in a sequenced or randomized pattern so as to so as to only illuminate areas adjacent to fewer than all of the plurality of key switches.

12. The keyboard apparatus according to claim 9, wherein said light emission portions are illuminated in a sequenced or randomized pattern so as to so as to only illuminate fewer than all of the plurality of key switches.

13. The keyboard apparatus according to claim 9, wherein said portable notebook type personal computer comprises a cover, and said backlight mechanism is turned on when said cover is opened.

14. A keyboard apparatus incorporated into a portable notebook type personal computer comprising a housing and a plurality of manually operated key switches, each key switch being slidably supported by a seat on the housing and having a keytop, an operation side of each of the keytops being illuminated from underneath by a backlight mechanism, wherein said backlight mechanism comprises an electroluminescent (EL) sheet placed on a top surface of the housing, said EL sheet having through holes corresponding to the positions of the key switches, said through holes permitting the seats on the housing to extend upwardly through the EL sheet, wherein said EL sheet has light emission portions corresponding to an area beneath each of the key switches, said light emission portions being formed by screen print stacking a transparent electrode layer, a fluorescent layer, a dielectric layer, a back electrode layer, and an isolation resist layer on a transparent sheet, and wherein the operation side of each of said keytops comprises a field portion and a character portion, said field portion being made of a light impermeable material and said character portion being made of a light permeable material so as to permit a transmission of light from said light emission portions through the character portion but not through the field portion.

15. The keyboard apparatus according to claim 14, wherein said EL sheet has secondary light emission portions corresponding to an area between each of the key switches so as to illuminate a plane contour of the key switches.

16. The keyboard apparatus according to claim 15, wherein said secondary light emission portions are illuminated in a sequenced or randomized pattern so as to so as to only illuminate areas adjacent to fewer than all of the plurality of key switches.

17. The keyboard apparatus according to claim 14, wherein said light emission portions are illuminated in a sequenced or randomized pattern so as to so as to only illuminate fewer than all of the plurality of key switches.

18. The keyboard apparatus according to claim 14, wherein said portable notebook type personal computer comprises a cover, and said backlight mechanism is turned on when said cover is opened.

* * * * *

UNITED STATES PATENT AND TRADEMARK OFFICE
CERTIFICATE OF CORRECTION

PATENT NO.    : 6,284,988 B1
DATED         : September 4, 2001
INVENTOR(S)   : Kazutoshi Watanabe et al.

Page 1 of 1

It is certified that error appears in the above-identified patent and that said Letters Patent is hereby corrected as shown below:

Column 11,
Line 59, delete "so as to" second occurrence.
Line 64, delete "so as to" second occurrence.

Column 12,
Line 31, delete "so as to" second occurrence.
Line 36, delete "so as to" second occurrence.

Column 13,
Line 3, delete "so as to" second occurrence.
Line 8, delete "so as to" second occurrence.

Column 14,
Line 18, delete "so as to" second occurrence.
Line 22, delete "so as to" second occurrence.

Signed and Sealed this

Twenty-eighth Day of May, 2002

Attest:

Attesting Officer

JAMES E. ROGAN
Director of the United States Patent and Trademark Office